United States Patent [19]

Kurosawa

[11] Patent Number: 4,825,370
[45] Date of Patent: Apr. 25, 1989

[54] ACTIVE SUSPENSION SYSTEM PROVIDING INHIBITION OF VEHICLE BODY VERTICAL OSCILLATION, AND METHOD OF OPERATION THEREOF

[75] Inventor: Ryuichi Kurosawa, Toyota, Japan

[73] Assignee: Toyota Jidosha Kabushiki Kaisha, Aichi, Japan

[21] Appl. No.: 77,871

[22] Filed: Jul. 27, 1987

[30] Foreign Application Priority Data

Jul. 31, 1986 [JP] Japan .................. 61-180942

[51] Int. Cl.⁴ .................. G06F 15/00; B60G 17/00
[52] U.S. Cl. .................. 364/424.05; 280/707
[58] Field of Search .................. 364/424.05; 280/6.1, 280/688, 703, 707

[56] References Cited

U.S. PATENT DOCUMENTS 4,741,554  5/1988  Okamoto .................. 280/703

Primary Examiner—David Mis
Attorney, Agent, or Firm—Oliff & Berridge

[57] ABSTRACT

A vehicle body is suspended on a vehicle wheel via a suspension actuator which continually produces a force for supporting the vehicle body on the vehicle wheel under the control of a calculation and control means which calculates a target value of the force to be produced by the suspension actuator according to the amount of relative movement between the vehicle body and the vehicle wheel and controls the suspension actuator so that the force produced thereby conforms to the calculated target value thereof.

7 Claims, 7 Drawing Sheets

ACTIVE SUSPENSION SYSTEM PROVIDING INHIBITION OF VEHICLE BODY VERTICAL OSCILLATION, AND METHOD OF OPERATION THEREOF

BACKGROUND OF THE INVENTION

The present invention relates to a suspension system for a vehicle and to a method of operation thereof, and more particularly relates to an active such suspension system for a vehicle and a method of operation thereof which provide particularly good inhibition of vertical oscillations of the body of the vehicle.

The present invention has been described in Japanese Patent Application Ser. No. Showa 61-180942 (1986), which was filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Various types of suspension for a vehicle have been utilized in the past. Particularly, so called active type suspensions have per se been conceived of. Particularly, in the article "Suspension Without Springs" published in the British magazine "Motor" on Sept. 10, 1983, in the article "On Active Service" published in the British magazine "Autocar" on the same date of Sept. 10, 1983, and in Japanese Patent Publication Ser. No. Showa 60-500662 (1985), there was proposed a vehicle suspension system not incorporating springs but instead suspending each of the wheels of the vehicle from the vehicle body by the use of an electrical-hydraulic type of servo actuator which produced a support force for displacing said vehicle wheel downwards with respect to said vehicle body, said support force being controlled by a control device to be increased or decreased according to a signal from a movement detection means which was provided for detecting relative movement between said vehicle wheel and said vehicle body.

However, in such a system, when there is a relative movement between the vehicle wheel and the vehicle body caused by an irregularity in the surface of the road upon which said vehicle wheel is running, the actuator for this vehicle wheel produces a support force which corresponds to the amount of such relative movement, and as a result of this, when the vehicle incorporating this system is traveling over a road the surface of which is irregular, the support force with which the actuator supports the vehicle body over the vehicle wheels is increased and decreased, and this increasing and decreasing force is transmitted to the vehicle body, as a result of which the vehicle body oscillates upwards and downwards in the vertical direction, in substantially the same way as necessarily occurs with a conventional type of suspension incorporating springs. In other words, the suspensions described in the above publications, although they do incorporate active type servo actuators, in their operational characteristics behave like conventional suspensions which are equipped with springs and shock absorbers, and accordingly these suspensions do not prevent vertical oscillations of the body of the vehicle when the vehicle is traveling over a road the surface of which is irregular or the like, and thus the riding characteristics of the vehicle remain as leaving something to be desired.

SUMMARY OF THE INVENTION

The inventors of the present invention have considered the problems detailed above in the aforementioned type of active suspensions incorporating such controllable actuators, and have considered various possibilities for controlling such actuators in order to improve the characteristics of the suspension system as a whole, and particularly in order to eliminate vertical oscillations of the body of the vehicle, when the vehicle is traveling over a road the surface of which is irregular.

Accordingly, it is the primary object of the present invention to provide an improved active suspension system for a vehicle, and a corresponding method for operating such an active suspension system, which avoid the problems detailed above.

It is a further object of the present invention to provide such an active suspension system for a vehicle and method of operation thereof, which ensure that, when the vehicle is traveling over a road the surface of which is irregular, provided that the undulations of the road surface are within the stroke limits of the actuators, substantially no vertical oscillation of the vehicle body is created.

It is a further object of the present invention to provide such an active suspension system for a vehicle and method of operation thereof, which ensure that, when the vehicle is traveling over a road the surface of which is irregular, or up or down an inclined slope, even if the undulations of the road surface are greater than the stroke limits of the actuators, vertical oscillation of the vehicle body only occurs very smoothly and substantially along with the large scale contours of the road surface, so that the ridability of the vehicle is improved as compared to the prior art.

According to the most general device aspect of the present invention, these and other objects are attained by, for a vehicle which is equipped with a body and a plurality of wheels for running on a road surface: an active suspension system, comprising: (a) a plurality of suspension actuators, each provided to one of said plurality of vehicle wheels and producing a supporting force, variable according to control of said actuator, for supporting said vehicle body above said one vehicle wheel; (b) a means for detecting the amount of relative movement between at least a one of said vehicle wheels and the vehicle body; (c) a means for detecting the rate of relative movement between said one of said vehicle wheels and the vehicle body; and: (d) a calculation and control means, for: (d1) inputting from said relative movement detecting means and from said rate of relative movement detecting means, respectively, a signal indicative of the amount of relative movement between said one of said vehicle wheels and the vehicle body, and a signal indicative of the rate of relative movement between said one of said vehicle wheels and the vehicle body; (d2) based upon said signals, determining the vertical displacement of the road surface portion upon which said one of said vehicle wheels is running; and: (d3) when said vertical displacement of said road surface portion is within the stroke limit of the actuator for said one of said vehicle wheels, controlling said actuator to produce a support force for said vehicle body over said one of said vehicle wheels which is sufficient to support the appropriate load component of said vehicle body; while: (d4) when said vertical displacement of said road surface portion exceeds the stroke limit of said actuator for said one of said vehicle wheels, calculating the value corresponding to the support force for said actuator necessary to travel along said road surface portion according to its determined vertical displacement, and based thereon controlling said actuator to alter the support force for said vehicle body over said one of said vehicle wheels; and this active suspension system may optionally further comprise a means for detecting the actual support force which is being provided by said actuator, in which case further said calculation and control means should be for comparing the actual support force of said actuator as detected by said detection means therefor with the calculated support force, and for carrying out a feedback process to bring the difference between these two values towards zero.

On the other hand, according to the most general method aspect of the present invention, these and other objects are attained by, for an active suspension system for a vehicle which is equipped with a body and a plurality of wheels for running on a road surface, comprising: (a) a plurality of suspension actuators, each provided to one of said plurality of vehicle wheels and producing a supporting force, variable according to control of said actuator, for supporting said vehicle body above said one vehicle wheel; (b) a means for detecting the amount of relative movement between at least a one of said vehicle wheels and the vehicle body; and: (c) a means for detecting the rate of relative movement between said one of said vehicle wheels and the vehicle body: a method of operation, wherein: (d1) from said relative movement detecting means and from said rate of relative movement detecting means there are respectively inputted a signal indicative of the amount of relative movement between said one of said vehicle wheels and the vehicle body, and a signal indicative of the rate of relative movement between said one of said vehicle wheels and the vehicle body; (d2) based upon said signals, the vertical displacement of the road surface portion upon which said one of said vehicle wheels is running is determined; and: (d3) when said vertical displacement of said road surface portion is within the stroke limit of the actuator for said one of said vehicle wheels, said actuator is controlled to produce a support force for said vehicle body over said one of said vehicle wheels which is sufficient to support the appropriate load component of said vehicle body; while: (d4) when said vertical displacement of said road surface portion exceeds the stroke limit of said actuator for said one of said vehicle wheels, the value corresponding to the support force for said actuator necessary to travel along said road surface portion according to its determined vertical displacement is calculated, and based thereon said actuator is controlled to alter the support force for said vehicle body over said one of said vehicle wheels; and, optionally, if said active suspension system further comprises a means for detecting the actual support force which is being provided by said actuator, then in this operational method thereof, further the actual support force of said actuator as detected by said detection means therefor may be compared with the calculated support force, and a feedback process may be carried out to bring the difference between these two values towards zero.

According to such a device and such a method as described above, when the magnitude of the vertical undulations in the road surface over which the vehicle is running is within the stroke limit of the actuator, then the actuator is controlled so as to produce a support force for said vehicle body over said one of said vehicle wheels which is just adequate and sufficient to support the appropriate load component of said vehicle body. Accordingly, the vehicle body is supported by the actuators with a substantially constant force being exerted by each of said actuators, and accordingly the vertical displacements of the vehicle wheels as they follow the contours of the undulations of the surface of the road are not transmitted to the vehicle body. Therefore, when the vehicle is traveling over an average type road surface which has relatively small undulations, the attitude of the body of the vehicle as it progresses down the road is maintained by its own inertia, and virtually no vertical oscillation of the vehicle body occurs at all. Accordingly, the ridability of the vehicle is very much enhanced, as compared to the prior art.

On the other hand, when the magnitude of the vertical undulations in the road surface over which the vehicle is running comes to exceed the stroke limit of the actuator, then, based upon the determination of the vertical displacement of the road surface portion, a value corresponding to the support force for said actuator necessary to travel along said road surface portion according to its determined vertical displacement is calculated, the actuator is controlled according to this computation result, and via the actuator the force acting between the vehicle wheel and the vehicle body is increased or decreased. As a result of this, when the vehicle is traveling over a road surface with relatively large undulations, or up or down an inclined slope such as a hill, the vehicle body moves upwards or downwards corresponding to the vertical undulations of the surface of the road in such a manner that the stroke of the actuators is not exceeded, and accordingly the small scale vertical displacements of the vehicle wheels as they follow the contours of the undulations of the surface of the road are not transmitted to the vehicle body, but on the contrary said vehicle body smoothly and progressively moves up and down following only the large scale contours of the surface of the road. Therefore, even when the vehicle is traveling over such a rough type road surface which has relatively large undulations, the ride comfort of the body of the vehicle as it progresses down the road is much enhanced as compared to the prior art.

Further, in the particular specialized case as outlined above that this active suspension system for a vehicle should further comprise a means for detecting the actual support force which is being provided by said actuator, and that further said calculation and control means should be for comparing the actual support force of said actuator as detected by said detection means therefor with the calculated support force, and for carrying out a feedback process to bring the difference between these two values towards zero, the accuracy of control of the motion of the vehicle over the surface of the road is even further enhanced.

It should be noted that the means for detecting the rate of relative movement between the one of the vehicle wheels and the vehicle body may be a speed detection means such as a speed sensor for detecting the rate of relative movement between this vehicle wheel and the vehicle body, or may be composed of a displacement detecting means for detecting the relative position of this vehicle wheel and the vehicle body, and a calculation means which carries out a calculation of differentiation with respect to time of the relative displacement amount as detected by this displacement detecting means. In this latter case, this calculation means may be incorporated with the previously described calculation and control means.

BRIEF DESCRIPTION OF THE DRAWINGS

The present invention will now be described with respect to the preferred embodiments of the system and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference symbols, unless otherwise so specified, denote the same parts and chambers and flow chart steps and so on; and:

DESCRIPTION OF THE PREFERRED EMBODIMENTS

The present invention will now be described with reference to the preferred embodiments of the device and of the method thereof, and with reference to the figures.

Overall Vehicle Suspension Structure

Figure 1:
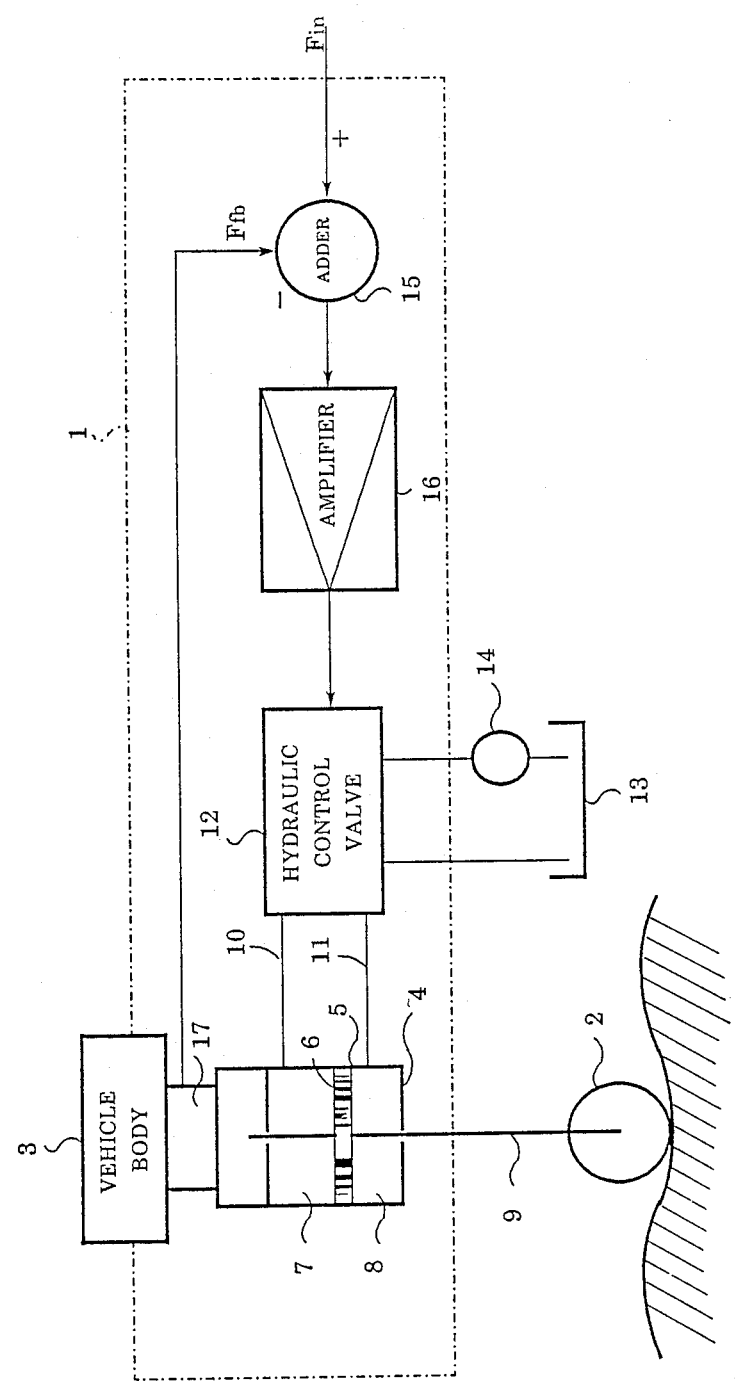
FIG. 1 is a schematic structural view of a wheel suspension servo actuator portion of a suspension system which incorporates the preferred embodiment of the vehicle wheel suspension system of the present invention and practices the preferred method embodiment.
Figure 2:
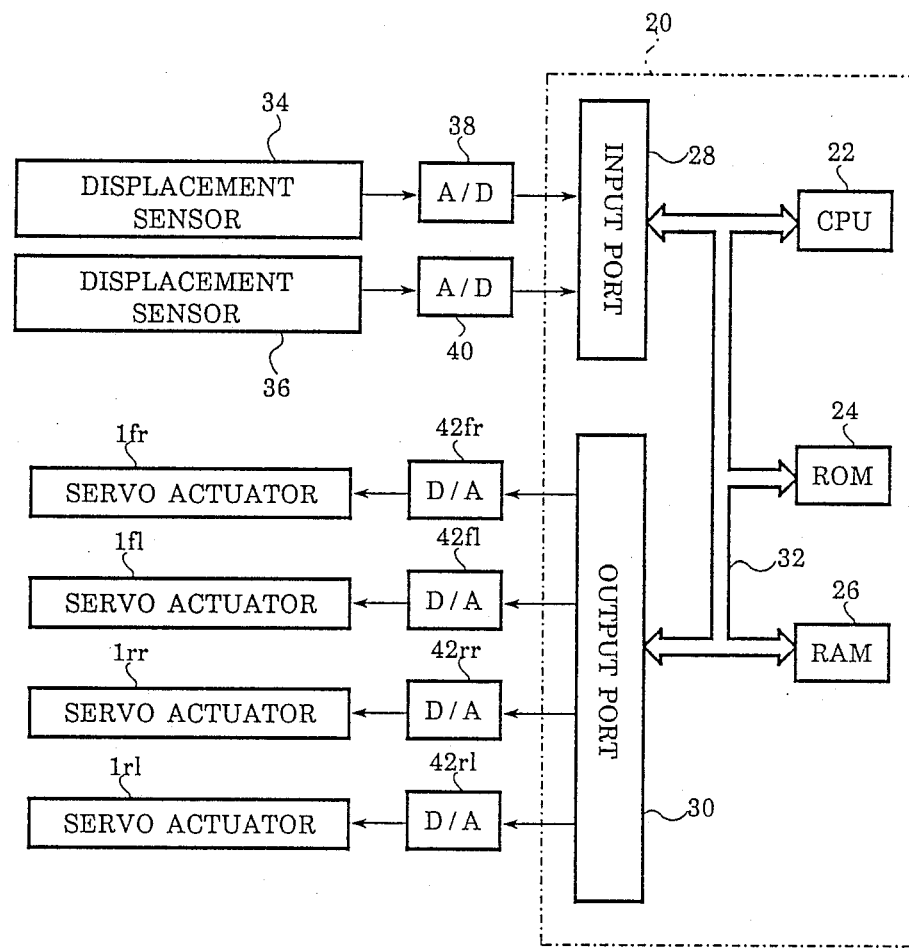
FIG. 2 is a block diagrammatical view showing the principal portions of an electronic control system (incorporating a micro computer) for four of the servo actuators of FIG. 1 for the four vehicle wheels, incorporated in said preferred embodiment of the suspension system of the present invention, for operating according to said preferred method embodiment.

FIG. 1 is a schematic structural view of a servo actuator portion of a suspension system, said servo actuator portion being for suspending an exemplary one of the four wheels of a four wheeled vehicle from the body of said vehicle, and said suspension system incorporating the preferred embodiment of the vehicle wheel suspension system of the present invention and practicing the preferred method embodiment; and FIG. 2 is a block diagrammatical view showing a control system portion of said suspension system along with all four such servo actuators. In FIG. 2, the servo actuator for the front right wheel of the vehicle (not particularly shown) is designated by the reference symbol 1fr, the servo actuator for the front left wheel of the vehicle (also not shown) is designated by the reference symbol 1fl, the servo actuator for the rear right wheel of the vehicle (likewise not shown) is designated by the reference symbol 1rr, and the servo actuator for the rear left wheel of the vehicle (not shown either) is designated by the reference symbol 1rl. each of these servo actuators, as shown in FIG. 1 for an exemplary one thereof designated as 1, is provided between a one designated as 2 of the vehicle wheels and the vehicle body 3, and supports said vehicle wheel 2 from said vehicle body 3, i.e., to be accurate, provides a force which biases said vehicle wheel 2 in the downward direction with respect to said vehicle body 3. This exemplary servo actuator 1 comprises an actuator 4 which, in this exemplary construction, is a cylinder-piston device comprising a cylinder member 5 formed with a bore, a piston 6 which slides in said bore of said cylinder member 5 and separates from one another an upper pressure chamber 7 formed above said piston 6 in said bore of said cylinder member 5 between said piston 6 and the upper end of said cylinder member 5 and a lower pressure chamber 8 formed below said piston 6 in said bore of said cylinder member 5 between said piston 6 and the lower end of said cylinder member 5. An actuator rod 9 is fixed to the piston member 6 and moves up and down with relation to the cylinder member 5 along with said piston member 6. The lower end of said actuator rod 9, in the figure and in the actual vehicle also, is connected to the one 2 of the vehicle wheels to which this actuator 4 is fitted in such a manner as to allow said vehicle wheel 2 to rotate about a substantially horizontal axis which is substantially lateral to the vehicle while being coupled to said vehicle wheel 2 with regard to vertical movement thereof; typically, in fact, said lower end of said actuator rod 9 will be connected to a suspension arm or the like to which said vehicle wheel 2 is mounted, but such details are not particularly shown in FIG. 1. The actuator rod 9 extends upwards out through a member which defines the upper end of the bore in the cylinder member 5 so as to delimit the upper pressure chamber 7 in the upward direction, as well as of course passing downwards through a member which defines the lower end of the bore in the cylinder member 5 so as to delimit the lower pressure chamber 8 in the downward direction; thereby, as the piston member 6 and the actuator rod 9 move axially in the cylinder member 5, the sum of the volume of the upper pressure chamber 7 and the volume of the lower pressure chamber 8 does not substantially change, although the individual volumes of said upper pressure chamber 7 and said lower pressure chamber 8 of course change.

The uper pressure chamber 7 is communicated, via a conduit 10, to one port of an electromagnetically actuated hydraulic fluid switching valve 12. And the lower pressure chamber 8 is communicated, via another conduit 111, to another port of said electromagnetically actuated hydraulic fluid switching valve 12. Further, other ports of said electromagnetically actuated hydraulic fluid switching valve 12 are connected to a hydraulic fluid reservoir or sump 13, and to the output port of a hydraulic fluid pressure pump 14, which itself picks up hydraulic fluid for pressurization from said hydraulic fluid reservoir 13. This electromagnetically actuated hydraulic fluid switching valve 12 may be of a per se known type, and can be in constant connection so as to receive the hydraulic fluid pressurized to a relatively high pressure level by the pressure pump 14, so that, after this pressurized hydraulic fluid is passed through an internal variable orifice (not particularly shown) of this switching valve 12, said hydraulic fluid is returned to the sump 13. In this case, by controlling the flow rate of the hydraulic fluid through the variable orifice, the difference between the hydraulic fluid pressure (hereinafter designated as "P1") supplied through the conduit 10 to the upper pressure chamber 7 and the hydraulic fluid pressure (hereinafter designated as "P2") supplied through the conduit 11 to the lower pressure chamber 8 can be regulated to be any arbitrary desired value. That is to say, according to the value of an electrical control signal supplied to this electromagnetically actuated hydraulic fluid switching valve 12, the value of this chamber pressure difference (P1-P2) can be set to any value desired, substantially within the range from the maximum pressure value which can be delivered by the pressure pump 14, to minus said maximum pressure value.

In the particular construction illustrated and described, each of the four electromagnetically actuated hydraulic fluid switching valves 12 of the four servo actuators 1fr, 1fl, 1rr, and 1rl of FIG. 2 is controlled by a control signal (which is a voltage signal) inputted from an adder 15 via an amplifier 16. When the voltage of the control signal outputted from this amplifier 16 is substantially zero (which is the case, as will be described in detail below, when the signals inputted to the adder 15 are Ffb=F0 and Fc=0), then it is arranged that the force exerted by the actuator 4, which may of course be expressed as A(P1-P2) where A is the effective pressure receiving area of the piston member 6 and (P1-P2) is the chamber pressure difference, is substantially equal to the corresponding load component of the weight of the vehicle body 3, in other words is substantially equal to that force which would steadily support the vehicle body 3 over this one 2 of the vehicle wheels, in a steady state situation. Thus, when the voltages of the control signals inputted from the adders 15 to the respective amplifiers 16 are zero, the chamber pressure differences (P1-P2) set by these amplifiers 16 for the respective ones of the four servo actuators 1fr, 1fl, 1rr, and 1rl are just sufficient to support the vehicle body 2 without raising or lowering it; hereinafter, these so called equilibrium chamber pressure difference (P1-P2) will be designated as Pfr, Pfl, Prr, and Prl. Further, in the cases that the voltage of one of these control signals inputted from one of the adders 15 to the respective amplifier 16 should become greater than zero, or should become less than zero, the chamber pressure difference (P1-P2) set by this amplifier 16 for its respective one of the four servo actuators 1fr, 1fl, 1rr, and 1rl will either increased over its equilibrium value Pfr, Pfl, Prr, or Prl, or will be diminished therefrom, respectively, and by an amount corresponding to the magnitude of the control signal voltage.

A load sensor 17 of a per se conventional type is provided between the vehicle body 3 and the actuator 4, so as to detect the actual load which is currently effective between said vehicle body 3 and said actuator 4, i.e. the load force which is currently being imposed by said vehicle body 3 on this one 2 of the vehicle wheels; and this load sensor 17 outputs an electrical output signal, of voltage designated as Ffb corresponding to this load force, to the minus terminal of the adder 15. And the adder 15 further receives at its plus terminal a signal Fin from the control circuit shown in FIG. 2, as will be described hereinafter.

As an alternative construction, it is possible for each of the actuators 4 to be constructed so that its actuator rod 9 does not extend in the upwards direction out through the member which defines the upper end of the bore in the cylinder member 5, while on the other hand of course said actuator rod 9 does pass in the downwards direction through the member which defines the lower end of the bore in the cylinder member 5, so as to be connected to the vehicle wheel 2; thereby, as the piston member 6 and the actuator rod 9 move axially in the cylinder member 5, the sum of the volume of the upper pressure chamber 7 and the volume of the lower pressure chamber 8 in fact does somewhat change, since the individual volumes of said upper pressure chamber 7 and said lower pressure chamber 8 in fact in this case change by different absolute amounts, albeit in opposite directions. In such a case, it will be appropriate to so construct the electromagnetically actuated hydraulic fluid switching valve 12, taking the effective pressure receiving area of the upper side of the piston member 6 as A1 and the effective pressure receiving area of the lower side of said piston member 6 as A2, so that, by varying the pressure P1 within the upper pressure chamber 7 and the pressure P2 within the lower pressure chamber 8 according to the control signal outputted from the amplifier 16, the actuator 4 is controlled to produce a force equal to $(A1 \cdot P1 - A2 \cdot P2)$. As another alternative construction, it is possible for each of the actuators 4 to be constructed so that its actuator rod 9 is connected to the vehicle body 3, while its cylinder member 5 is rotatably connected to the vehicle wheel 2 for this actuator 4. Further, it is possible for the hydraulic fluid reservoir 13 and the pressure pump 14 to be common to all of the four actuators 4 for all of the four vehicle wheels 2, and also, although the preferred hydraulic medium for use in this system is hydraulic fluid, i.e. an oily or petroleum derived fluid, as an alternative any fluid other than such hydraulic fluid may be utilized, as long as said hydraulic fluid is substantially incompressible.

The input signal Fin to the adder 15 is made up from a basic control signal F0 for controlling the electromagnetically actuated hydraulic fluid switching valve 12 in such a manner that the force generated by each of the actuators 4 is substantially equal to the load component imposed upon the corresponding vehicle wheel 2 by the vehicle body 3, and a control signal Fc for controlling the displacement of the piston member 6 in the cylinder member 5 from a base position, or the rate of movement of said piston member 6 in said cylinder member 5; this is inputted to an electronic suspension control system incorporating a micro computer 20 and shown in FIG. 2 in block diagrammatical view. This electronic suspension control system incorporating the micro computer 20 functions according to principles which incorporate the concept of the preferred embodiments of the active suspension system and method of the present invention, as will be explained hereinafter. No concrete illustration of the specific structure of any particular realization of the microcomputer 20 will be given herein, since various possibilities for the details thereof can be easily supplemented by one of ordinary skill in the electronic and computer programming art based upon the functional disclosures set out in this specification. Further, the micro computer 20 operates at the behest of a control program which will not be completely detailed herein, since the details thereof which are not disclosed in this specification can likewise be easily supplemented by one of ordinary skill in the electronic and computer programming art based upon the functional disclosures set out herein and explained by the FIG. 3 flow chart, to be described shortly. However, it should be particularly understood that such realizations in the micro computer form, although preferred, are not the only ways in which the suspension control system can be provided; in other possible embodiments it could be constituted as an electrical device not incorporating a microprocessor. In the preferred case, however, as shown in FIG. 2, the micro computer 20 comprises: a CPU (central processing unit) 22 which obeys said control program to be described shortly and which inputs data, performs calculations, and outputs data; a ROM (read only memory) 24 which stores said program to be described shortly and initialization data therefor and so on; and a RAM (random access memory) 26 which stores the results of certain intermediate calculations and data and so on; and these devices together will constitute a logical calculation circuit, being joined together by a common bus 32 which also links them to an input port 28 and to an output port 30 which together perform input and output for the system. Also, there are provided analog to digital converters or A/D converters for processing input signals to the input port 28, and digital to analog converters or D/A converters for processing output signals from the output port 30.

In more detail, the following input means and output means are provided to this system. A displacement sensor 34, provided to the servo actuator 1fr for the right front vehicle wheel, detects the displacement (designated hereinafter as "y1") of the piston member 6 of the actuator 4 thereof relative to the cylinder member 5 thereof, and produces an output signal representative thereof; in this preferred embodiment, the direction of extension of this actuator 1fr, i.e. the direction of extension of the actuator rod 9 thereof in the downwards direction so as to raise the vehicle body 3 above the corresponding vehicle wheel 2, is taken as positive. Similarly, another displacement sensor 36, provided to the servo actuator 1fr for the left front vehicle wheel, detects the displacement (designated hereinafter as "y1") of the piston member 6 of the actuator 4 thereof relative to the cylinder member 5 thereof, and produces an output signal representative thereof; the sense of this output signal is the same as defined above for the front right vehicle wheel. The output signal of the displacement sensor 34 for the front right vehicle wheel 2 is supplied, via an A/D converter 38 of the type described above, to the input port 28 and thence in digital form to be available to the CPU 22 as an indication of the displacement y1 of the actuator 4 for this front right vehicle wheel; similarly, the output signal of the displacement sensor 36 for the front left vehicle wheel 2 is supplied, via another A/D converter 40 of the type described above, to the input port 28 and thence in digital form to be available to the CPU 22 as an indication of the displacement y2 of the actuator 4 for this front left vehicle wheel.

Figure 3:
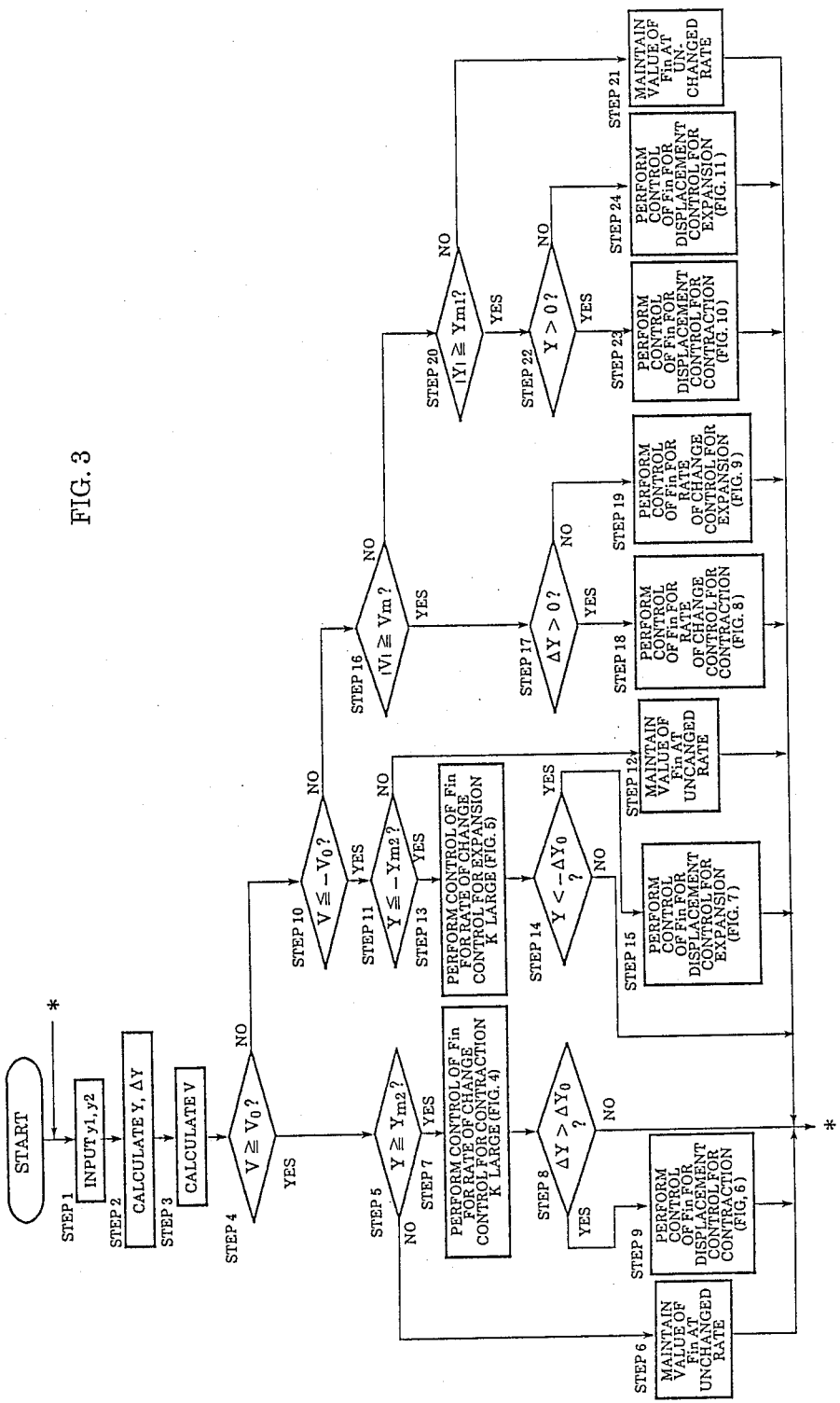
FIG. 3 is a fragmentary flow chart for showing the operation of this FIG. 2 control system according to the preferred method embodiment of the present invention, illustrating the flow of a program portion which is obeyed by a central processing unit of a microcomputer which is shown by a block in FIG. 2 and is included in this preferred device embodiment.

In the ROM 24 there is stored a program for being obeyed by the CPU 22, the flow chart of which is shown in FIG. 3 and which will be explained shortly, and also there is stored a program for producing, when so commanded, the force patterns as shown in the upper portions of FIGS. 4 through 11, as will be explained later, and for producing and calculating various expressions as described below. In the RAM 26 there are stored the data which have been inputted through the input port 28, and also the temporary results of various calculations performed by the CPU 22; the CPU 22 is also arranged to output control signals Fin based upon these calculation results via the output port 30 and through D/A converters 42fr, 42fl, 42rr, and 42rl respectively to the plus input terminals of the adders 15 of the respective servo actuators 1fr, 1fl, 1rr, and 1rl for the front right vehicle wheel, the front left vehicle wheel, the rear right vehicle wheel, and the rear left vehicle wheel respectively.

This preferred embodiment of the active suspension system of the present invention generally functions according to the control program which will now be explained, according to the preferred embodiment of the active suspension operation method of the present invention.

The Control Program According to the Preferred Method Embodiment

FIG. 3 shows a flow chart for explaining the operation of a portion of the aforementioned control program which directs the operation of the CPU 22, so as to realize the preferred embodiment of the active suspension operation method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. This program portion, after the START block thereof, consists essentially of a large loop which, as will become apparent hereinafter, is executed at intervals of for example one hundred milliseconds according to road condition, of course as the vehicle incorporating this suspension system is driven.

Figure 4:
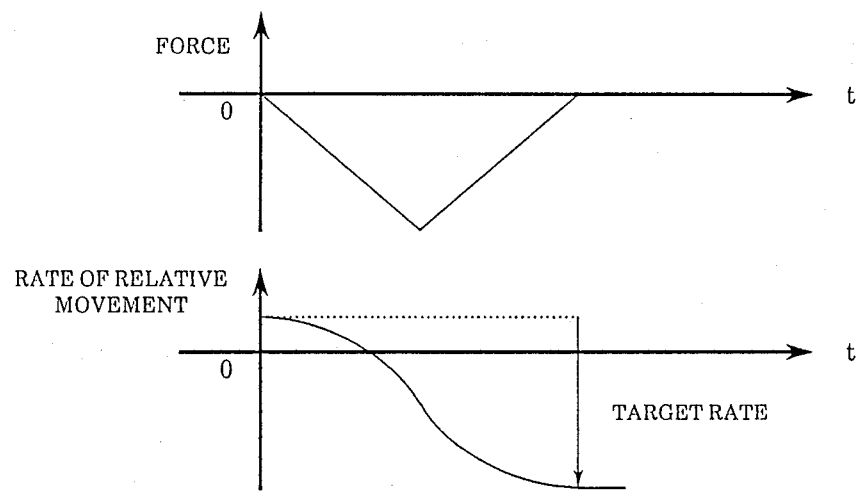
FIG. 4 is a pair of time charts, in both of which time is shown along the horizontal axis and in one of which force is shown along the vertical axis while in the other thereof rate of relative movement of a piston of the FIG. 1 actuator relative to its cylinder member is shown along the vertical axis, respectively for showing force time behavior characteristics and relative movement rate time behavior characteristics, in the case of relatively suddenly decreased speed control (compression, K large) when the actuator is in the expanding state.
Figure 5:
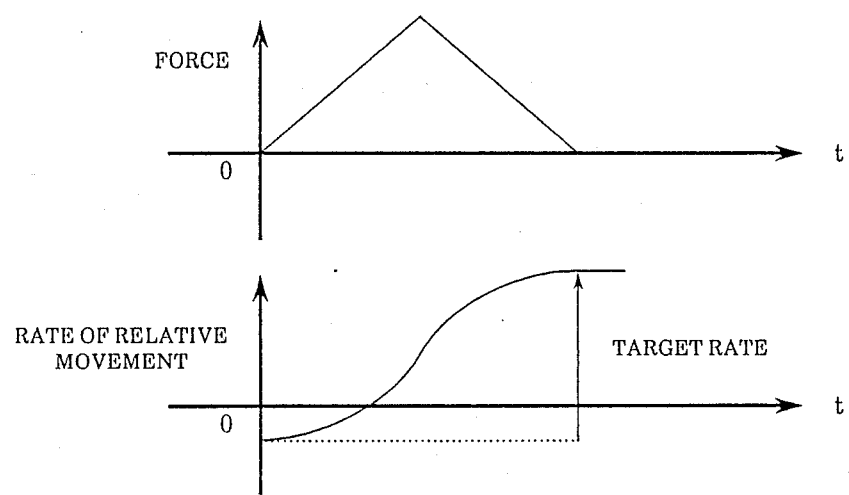
FIG. 5 is a similar pair of time charts, in both of which time is shown along the horizontal axis and in one of which force is shown along the vertical axis while in the other thereof rate of relative movement of a piston of the FIG. 1 actuator relative to its cylinder member is shown along the vertical axis, respectively for showing force time behavior characteristics and relative movement rate time behavior characteristics, in the case of relatively suddenly increased speed control (expansion, K large) when the actuator is in the contracting state.
Figure 6:
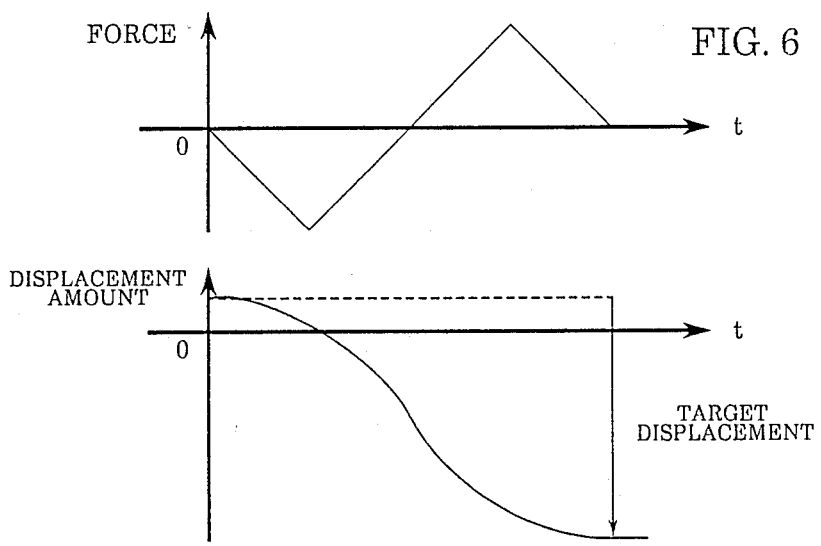
FIG. 6 is a similar pair of time charts, in both of which time is shown along the horizontal axis and in one of which force is shown along the vertical axis while in the other thereof displacement from a standard position of a piston of the FIG. 1 actuator relative to its cylinder member is shown along the vertical axis, respectively for showing force time behavior characteristics and displacement time behavior characteristics, in the case of decreased displacement control (compression) when the actuator is in the expanding state.
Figure 7:
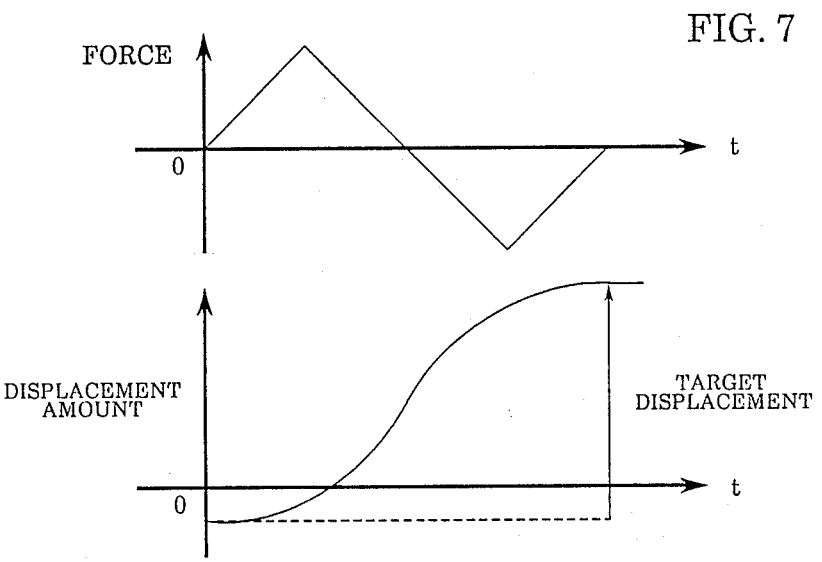
FIG. 7 is a similar pair of time charts, in both of which time is shown along the horizontal axis and in one of which force is shown along the vertical axis while in the other thereof displacement from a standard position of a piston of the FIG. 1 actuator relative to its cylinder member is shown along the vertical axis, respectively for showing force time behavior characteristics and displacement time behavior characteristics, in the case of increased displacement control (expansion) when the actuator is in the contracting state.
Figure 8:
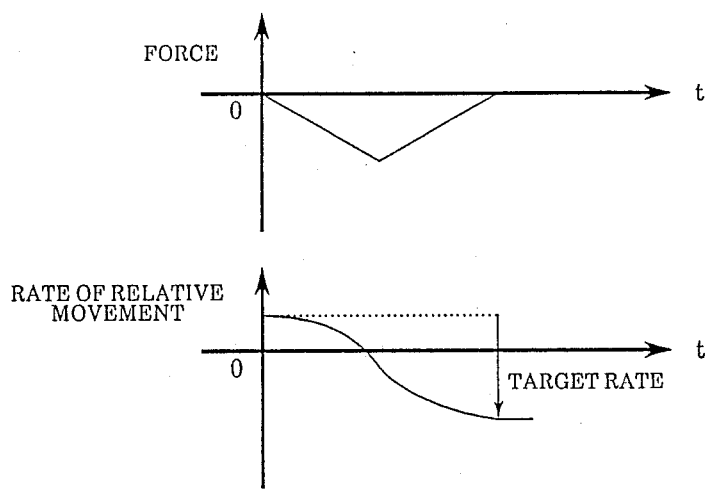
FIG. 8 is a similar pair of time charts, in both of which time is shown along the horizontal axis and in one of which force is shown along the vertical axis while in the other thereof rate of relative movement of a piston of the FIG. 1 actuator relative to its cylinder member is shown along the vertical axis, respectively for showing force time behavior characteristics and relative movement rate time behavior characteristics, in the case of decreased speed control (compression) when the actuator is in the expanding state.
Figure 9:
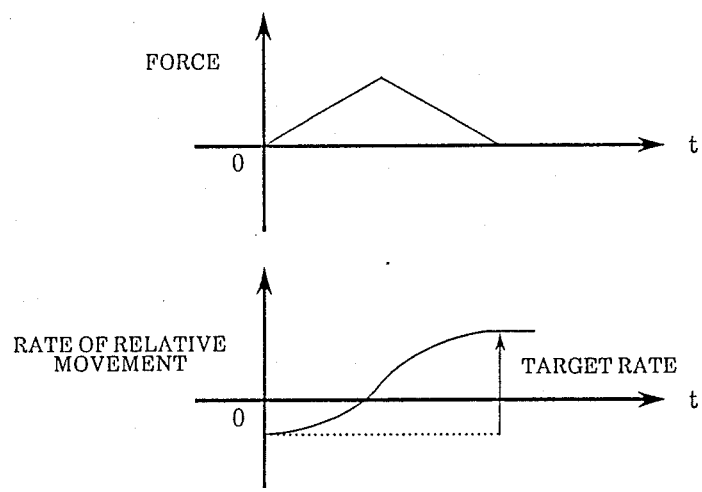
FIG. 9 is a similar pair of time charts, in both of which time is shown along the horizontal axis and in one of which force is shown along the vertical axis while in the other thereof rate of relative movement of a piston of the FIG. 1 actuator relative to its cylinder member is shown along the vertical axis, respectively for showing force time behavior characteristics and relative movement rate time behavior characteristics, in the case of increased speed control (expansion) when the actuator is in the contracting state.
Figure 10:
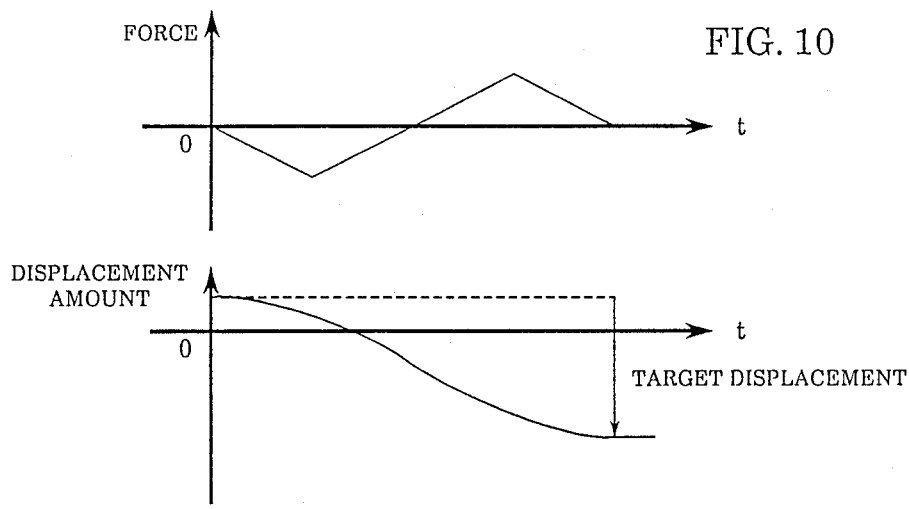
FIG. 10 is a similar pair of time charts, in both of which time is shown along the horizontal axis and in one of which force is shown along the vertical axis while in the other thereof displacement from a standard position of a piston of the FIG. 1 actuator relative to its cylinder member is shown along the vertical axis, respectively for showing force time behavior characteristics and displacement time behavior characteristics, in the case of relatively gradually decreased displacement control (compression) when the actuator is in the expanding state.
Figure 11:
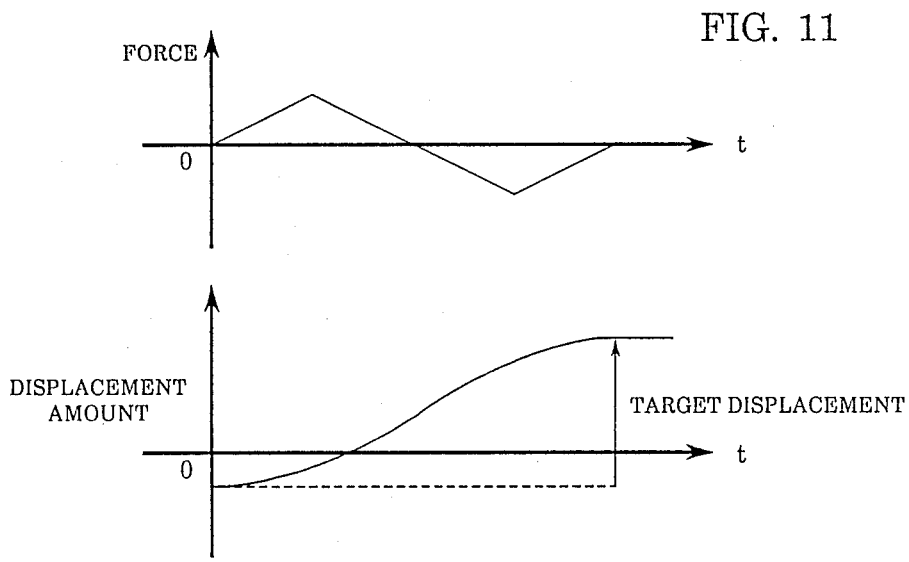
FIG. 11 is a similar pair of time charts, in both of which time is shown along the horizontal axis and in one of which force is shown along the vertical axis while in the other thereof displacement from a standard position of a piston of the FIG. 1 actuator relative to its cylinder member is shown along the vertical axis, respectively for showing force time behavior characteristics and displacement time behavior characteristics, in the case of relatively gradually increased displacement control (expansion) when the actuator is in the contracting state.

It should be understood, for explanation of the FIG. 3 flow chart, that: in FIG. 4 there are shown a force pattern (in the upper portion of the figure) and a velocity pattern (in the lower portion of the figure) of the rate of motion of the piston member 6 with respect to the cylinder member 5, in the case of relatively suddenly decreased speed control (compression, K large) in the case that the actuator 4 is in the expanding state; in FIG. 5 there are similarly shown a force pattern (in the upper portion of the figure) and a velocity pattern (in the lower portion of the figure) of the rate of motion of the piston member 6 with respect to the cylinder member 5, in the case of relatively suddenly increased speed control (expansion, K large) in the case that the actuator 4 is in the contracting state; in FIG. 6 there are shown a force pattern (in the upper portion of the figure) and a displacement pattern) in the lower portion of the figure) of the position of the piston member 6 from a standard position with respect to the cylinder member 5, in the case of decreased displacement control (compression) in the case that the actuator 4 is in the expanding state; in FIG. 7 there are similarly shown a force pattern (in the upper portion of the figure) and a displacement pattern (in the lower portion of the figure) of the position of the piston member 6 from a standard position with respect to the cylinder member 5, in the case of increased displacement control (expansion) in the case that the actuator 4 is in the contracting state; in FIG. 8 there are shown a force pattern (in the upper portion of the figure) and a velocity pattern (in the lower portion of the figure) of the rate of motion of the piston member 6 with respect to the cylinder member 5, in the case of decreased speed control (compression) in the case that the actuator 4 is in the expanding state; in FIG. 9 there are similarly shown a force pattern (in the upper portion of the figure) and a velocity pattern (in the lower portion of the figure) of the rate of motion of the piston member 6 with respect to the cylinder member 5, in the case of increased speed control (expansion) in the case that the actuator 4 is in the contracting state; in FIG. 10 there are shown a force pattern (in the upper portion of the figure) and a displacement pattern (in the lower portion of the figure) of the position of the piston member 6 from a standard position with respect to the cylinder member 5, in the case of relatively gradually decreased displacement control (compression) in the case that the actuator 4 is in the expanding state; and in FIG. 11 there are similarly shown a force pattern (in the upper portion of the figure) and a displacement pattern (in the lower portion of the figure) of the position of the piston member 6 from a standard position with respect to the cylinder member 5, in the case of relatively gradually increased displacement control (expansion) in the case that the actuator 4 is in the contracting state.

Thus, after the START block, first in the step 1 the CPU 22 inputs via the A/D converters 38 and 40 the output signals of the displacement sensors 34 and 36 which represent the values y1 and y2 of the displacements from their standard positions with respect to their cylinder members 5 of the pistons 6 of the actuators 4 for respectively the front right vehicle wheel and the front left vehicle wheel, and then the flow of control passes next to the step 2.

In this step 2, the CPU 22 calculates the average value Y of these displacements y1 and y2 for respectively the front right vehicle wheel and the front left vehicle wheel, according to the equation (1) below, and also the CPU 22 calculates, according to the equation (2) below, the variation amount delta-Y of this average value Y between its value at the present time (the value for Y at this present time being denoted as $Y_n$) and its value (denoted as $Y_{n-1}$) detected or calculated at a time interval delta-t earlier before the detection or calculation of this value $Y_n$, and delta-t may typically be the time required for one iteration around the main loop of the FIG. 3 flow chart, in which case $Y_{n-1}$ will be the value for this average value Y detected or calculated in the last iteration around said FIG. 3 flow chart main loop; or, alternatively, delta-t may be a fixed short time interval such as from about 20 to about 200 ms. In any case, after this step 2, the flow of control passes next to the step 3.

$$Y = (y1 + y2)/2 \tag{1}$$

$$\text{delta-}Y = Y_n - Y_{n-1} \tag{2}$$

In the next step 3, the CPU 22 calculates, based either upon the equations (3) through (5) below or upon the equation (6) below, the average value V of the relative rate of displacement of the piston member 6 with respect to the cylinder member 5 for the front right vehicle wheel and for the front left vehicle wheel (with the direction of expansion of the relevant actuator 4 being taken as positive), and then the flow of control passes next to the decision step 4. It should again be noted that in the equations (3) through (6) below the expressions y1$_n$ and y2$_n$ denote respectively the values for y1 and y2 at this time as detected in this current iteration around the main loop of the FIG. 3 flow chart, while the expressions y1$_{n-1}$ and y2$_{n-1}$ denote respectively the values for y1 and y2 detected or calculated at a time interval delta-t earlier before the detection or calculation of these values y1$_n$ and y2$_n$, and delta-t may typically be the time required for one iteration around the main loop of the FIG. 3 flow chart, in which case y1$_{n-1}$ and y2$_{n-1}$ will be respectively the values for y1 and y2 detected or calculated in the last iteration around said FIG. 3 flow chart main loop; or, alternatively, delta-t may be a fixed short time interval such as from about 20 to about 200 ms.

$$v1 = (y1_n - y1_{n-1})/\text{delta-}t \quad (3)$$

$$v2 = (y2_n - y2_{n-1})/\text{delta-}t \quad (4)$$

$$V = (v1 + v2)/2 \quad (5)$$

$$V = \text{delta-}Y/\text{delta-}t \quad (6)$$

However, as a more desirable alternative, the values of the above-mentioned y1, y2, y, y1$_n$, y2$_n$, etc. which are actually used in the control process may each be an average value of several instant values thereof within each period of delta-t, so that they are not affected by any minute local irregularities of the road surface and/or vibrations of the vehicle body which would occur at such a high frequency basis that will repeat several times within the period of delta-t. Such a multi-detection and averaging process will be readily incorporated in the control flow shown in FIG. 3 by employing an appropriate subroutine adapted to be operated as squeezed into the main routine of control.

In the next decision step 4, the CPU 22 makes a decision as to whether or not the average rate of change V as calculated in the previous step 3 is greater than or equal to a certain determinate threshold value V0 (which is a positive constant). If the result of this decision is YES, so that said average rate of change V is indeed greater than or equal to V0, which indicates that the rate of expansion of the actuators is relatively rapid, then the flow of control passes next to the step 5; but, if the result of this decision is NO, so that in fact said average rate of change V is less than V0, which indicates that the rate of expansion of the actuators is not relatively rapid, then the flow of control passes next to the step 10.

In the decision step 5, at which point it is determined that the rate of expansion of the actuators is relatively rapid, the CPU 22 makes a decision as to whether or not the average value Y of the displacement amount of the actuators is greater than or equal to a certain determinate threshold value Ym$_2$ (which again is a positive constant). If the result of this decision is YES, so that said average value Y of the displacement amount of the actuators is indeed greater than or equal to this value Ym$_2$, i.e. is excessive, then the flow of control passes next to the step 7, which is a program portion for handling the case in which the road surface upon which the vehicle is running is a steep downhill slope or is a dropping and unevenly undulating surface; but, if the result of this decision is NO, so that said average value Y of the displacement amount of the actuators is not in fact greater than or equal to this value Ym$_2$, i.e. is not excessive, then the flow of control passes next to the step 6, which is a program portion for handling the case in which the road surface upon which the vehicle is running is a surface of which the undulations are relatively small.

Thus, in the step 6, the CPU 22 maintains the value of the output Fin which is being inputted to the adder of each of the actuators without change, according to a force pattern generation program module (at an unchanged rate) not particularly shown herein, and then the flow of control passes next, as indicated by the asterisk label, back to the program step 1, to cycle around repeatedly in a closed loop.

On the other hand, in the step 7, according to a force pattern generation program module (rate of change control for contraction, with K large) not particularly detailed herein, the CPU 22 varies the control signal Fc for the value of the output Fin which is being inputted to the adder of each of the servo actuators, so as to vary the force pattern of each of these servo actuators as shown in FIG. 4 and so as thereby to vary the force exerted by the piston members 6 of said servo actuators with repsect to their cylinder members 5, and thereby to vary the rate of absolute movement of the vehicle body, as also shown in that figure; and then the flow of control passes next to the decision step 8.

In this next decision step 8, the CPU 22 makes a decision as to whether or not the variation amount delta-Y of the average value Y of the displacements y1 and y2 for respectively the front right vehicle wheel and the front left vehicle wheel is greater than or equal to a determinate threshold value delta-Y0, which is a positive constant. If the result of this decision is YES, so that indeed delta-Y is currently greater than or equal to delta-Y0, i.e. the vertical fluctuations of the road sufface in the downward direction are currently relatively large, then the flow of control passes next via the asterisk label back to the program step 1 to cycle around repeatedly in a closed loop; but, if the result of this decision is NO, so that in fact delta-Y is not currently greater than or equal to delta-Y0, i.e. the vertical fluctuations of the road surface in the downward direction are not currently relatively large, then the flow of control passes next to the step 9.

In this step 9, according to another force pattern generation program module (displacement control for contraction) not particularly detailed herein, the CPU 22 varies the control signal Fc for the value of the output Fin which is being inputted to the adder of each of the servo actuators, so as, by suitably varying the force exerted on the pistons 6 of these servo actuators as shown in FIG. 6, to vary the force exerted by the pistons 6 with respect to the cylinder members 5 of each of these servo actuators as also shown in that figure, so as to vary the absolute displacement of the vehicle body; and then the flow of control passes next via the asterisk label back to the program step 1 to cycle around repeatedly in a closed loop.

On the other hand, in the decision step 10, to which point the flow of control passes from the NO branch from the decision step 4, in other words when it is determined in said decision step 4 that the average rate of change V as calculated in the step 3 is not greater than or equal to the certain determinate threshold value V0, the CPU 22 next makes a decision as to whether or not the average rate of change V (again as calculated in the previous step 3) is less than or equal to minus said certain determinate threshold value V0 which is a positive constant. If the result of this decision is YES, so that said average rate of change V is indeed less than or equal to $-V0$, which indicates that the rate of contraction of the actuators is relatively rapid, then the flow of control passes next to the decision step 11; but, if the result of this decision is NO, so that in fact said average rate of change V is greater than $-V0$, which indicates that the rate of contraction of the actuators is not relatively rapid, and thus that the slope of the road surface upon which the vehicle is running is relatively gentle, then the flow of control passes next to the step 16.

In the decision step 11, at which point it is determined that the rate of contraction of the actuators is relatively rapid, the CPU 22 makes a decision as to whether or not the average value Y of the displacement amount of the actuators is less than or equal to minus the certain determinate threshold value $Ym_2$ (which now is therefore a negative constant). If the result of this decision is YES, so that said average value Y of the displacement amount of the actuators is indeed less than or equal to this value $-Ym_2$, i.e. is excessive in the negative direction, then the flow of control passes next to the step 13, which is a program portion for handling the case in which the road surface upon which the vehicle is running is a steep uphill slope or is a rising and unevenly undulating surface; but, if the result of this decision is NO, so that said average value Y of the displacement amount of the acuators is not in fact less than or equal to this value $-Ym_2$, i.e. is not excessive in the negative direction, then the flow of control passes next to the step 12, which is a program portion for handling the case in which the road surface upon which the vehicle is running is a surface of which the undulations are relatively small.

Thus, in the step 12, the CPU 22 maintains the value of the output Fin which is being inputted to the adder of each of the actuators without change, according to a force pattern generation program module (at an unchanged rate) not particularly shown herein, and then the flow of control passes next, as indicated by the asterisk label, back to the program step 1, to cycle around repeatedly in a closed loop.

On the other hand, in the step 13, according to a force pattern generation program module (rate of change control for expansion) not particularly detailed herein, the CPU 22 varies the control signal Fc for the value of the output Fin which is being inputted to the adder of each of the servo actuators, so as to vary the force pattern of each of these servo actuators as shown in FIG. 5 and so as thereby to vary the force exerted by the piston members 6 of said servo actuators with respect to their cylinder members 5, and thereby to vary the rate of absolute movement of the vehicle body as also shown in that figure; and then the flow of control passes next to the decision step 14.

In this next decision step 14, the CPU 22 makes a decision as to whether or not the variation amount delta-Y of the average value Y of the displacements y1 and y2 for respectively the front right vehicle wheel and the front left vehicle wheel, as calculated in the step 2, is less than or equal to minus the determinate threshold value delta-Y0, which accordingly is a negative constant. If the result of this decision is YES, so that indeed delta-Y is currently less than or equal to -delta-Y0, i.e. the vertical fluctuations of the road surface in the upward direction are currently relatively large, then the flow of control passes next via the asterisk label back to the program step 1 to cycle around repeatedly in a closed loop; but, if the result of this decision is NO, so that in fact delta-Y is not currently less than or equal to -delta-Y0, i.e. the vertical fluctuations of the road surface in the upward direction are not currently relatively large, then the flow of control passes next to the step 15.

In this step 15, according to another force pattern generation program module (displacement control for expansion) not particularly detailed herein, the CPU 22 varies the control signal Fc for the value of the output Fin which is being inputted to the adder of each of the servo actuators, so as, by suitably varying the force exerted on the pistons 6 of these servo actuators as shown in FIG. 7, to vary the force exerted by the pistons 6 with respect to the cylinder members 5 of each of these servo actuators as also shown in that figure, so as to vary the absolute displacement of the vehicle body; and then the flow of control passes next via the asterisk label back to the program step 1 to cycle around repeatedly in a closed loop.

On the other hand, in the decision step 16, to which the flow of control passes if it is determined in the decision steps 4 and 10 that the current value of the average rate of change of servo actuator piston displacement V is between the upper and lower limits of $+V0$ and $-V0$, the CPU 22 makes a decision as to whether or not the absolute value of said average rate of change V is greater than a certain determinate value Vm. If the result of this decision is YES, so that indeed the absolute value of said average rate of change V is greater than said determinate value Vm, then the flow of control passes next to the decision step 17; but, if the result of this decision is NO, so that in fact the absolute value of said average rate of change V is not greater than said determinate value Vm, then the flow of control passes next to the decision step 20.

In the decision step 17, the CPU 22 makes a decision as to whether or not the variation amount delta-Y of the average value Y of the displacements y1 and y2 for respectively the front right vehicle wheel and the front left vehicle wheel is positive, i.e. as to whether or not the actuators are in the overall process of expanding. If the result of this decision is YES, so that indeed delta-Y is positive and the actuators are overall expanding, then the flow of control passes next to the step 18; but, if the result of this decision is NO, so that in fact delta-Y is not now positive and the actuators are not now overall expanding, then the flow of control passes next to the step 19.

In the step 18, according to another force pattern generation program module (rate of change control for contraction) not particularly detailed herein, the CPU 22 varies the control signal Fc for the value of the output Fin which is being inputted to the adder of each of the servo actuators, so as to vary the force pattern of each of these servo actuators as shown in FIG. 8 and so as thereby to vary the force exerted by the piston members 6 of said servo actuators with respect to their cylinder members 5, and thereby to vary the rate of absolute movement to the vehicle body, as also shown in that figure; and then the flow of control passes next via the asterisk label back to the program step 1 to cycle around repeatedly in a closed loop.

On the other hand, in the step 19, according to another force pattern generation program module (rate of change control for expansion) not particularly detailed herein, the CPU 22 varies the control signal Fc for the value of the output Fin which is being inputted to the adder of each of the servo actuators, so as to vary the force pattern of each of these servo actuators as shown in FIG. 9 and so as thereby to vary the force exerted by the piston members 6 of said servo actuators with respect to their cylinder members 5, and thereby to vary the rate of absolute movement of the vehicle body, as also shown in that figure; and then the flow of control passes next via the asterisk label back to the program step 1 to cycle around repeatedly in a closed loop.

Now, in the decision step 20, to which the flow of control passes if it is determined in the decision steps 4 and 10 that the current value of the average rate of change of servo actuator piston displacement V is between the upper and lower limits of $+V0$ and $-V0$, and if further it is determined in the decision step 16 that the absolute value of the average rate of change V is not greater than the determinate value Vm, the CPU 22 makes a decision as to whether or not the absolute value of the average value Y of the displacements y1 and y2 for respectively the front right vehicle wheel and the front left vehicle wheel is greater than a certain determinate value $Ym_1(Ym_1 < Ym_2)$. If the result of this decision is YES, so that indeed the absolute value of said average displacement Y is greater than said determinate value $Ym_1$, then the flow of control passes next to the decision step 22; but, if the result of this decision is NO, so that in fact the absolute value of said average displacement Y is not greater than said determinate value $Ym_1$, then the flow of control passes next to the step 21.

In the decision step 22, the CPU 22 makes a decision as to whether or not said average value Y of the displacements y1 and y2 for respectively the front right vehicle wheel and the front left vehicle wheel is positive, i.e. as to whether or not the actuators are overall expanded so that their piston member 6 are at positions, overall, below their standard positions. If the result of this decision is YES, so that indeed Y is positive and the actuators are now overall expanded, then the flow of control passes next to the step 23; but, if the result of this decision is NO, so that in fact Y is not now positive and the actuators are not now overall expanded, then the flow of control passes next to the step 24.

In the step 23, according to another force pattern generation program module (displacement control for contraction) not particularly detailed herein, the CPU 22 varies the control signal Fc for the value of the output Fin which is being inputted to the adder of each of the servo actuators, so as to vary the force pattern of each of these servo actuators as shown in FIG. 10 and so as thereby to vary the force exerted by the pistons 6 with respect to the cylinder members 5 of each of these servo actuators, as also shown in that figure, so as to vary the absolute displacement of the vehicle body; and then the flow of control passes next via the asterisk label back to the program step 1 to cycle around repeatedly in a closed loop.

On the other hand, in the step 24, according to another force pattern generation program module (displacement control for expansion) not particularly detailed herein, the CPU 22 varies the control signal Fc for the value of the output Fin which is being inputted to the adder of each of the servo actuators, so as to vary the force pattern of each of these servo actuators as shown in FIG. 11 and so as thereby to vary the force exerted by the pistons 6 with respect to the cylinder members 5 of each of these servo actuators, as also shown in that figure, so as to vary the absolute displacement of the vehicle body; and then the flow of control passes next via the asterisk label back to the program step 1 to cycle around repeatedly in a closed loop.

Finally, in the step 21, the CPU 22 maintains the value of the output Fin which is being inputted to the adder of each of the actuators without change, according to a force pattern generation program module (at an unchanged rate) not particularly shown herein, and then as before the flow of control passes next, as indicated by the asterisk label, back to the program step 1, to cycle around repeatedly in a closed loop.

Operation of this Preferred Method Embodiment

Next, the operation of this preferred embodiment of the method of operation of the active suspension system of the present invention will be explained by distinguishing the following cases: (a) when the vehicle is traveling along a substantially level road; (b) when the vehicle is traveling along a road which has small undulations, so that the vertical displacement of the road surface is within the vertical stroke limits of the piston of each of the servo actuators; (c) when the vehicle is traveling along a road which ascends steeply, or along an uneven road; (d) when the vehicle is traveling along an inclined road which has a relatively gradual slope, so that the vertical displacement of the road surface is relatively gradual; and (e) when the vehicle is traveling along a very gently inclined road which has a very gentle slope, so that the vertical displacement of the road surface is extremely gradual.

(A) The Case When the Vehicle is Traveling Along a Substantially Level Road

In this case, during the performance by the CPU 22 of the program whose flow chart is shown in FIG. 3, in each iteration around the large loop thereof: the result of the decision in the decision step 4 will be NO, so that the flow of control will pass to the decision step 10; the result of the decision in this decision step 10 will be NO, so that the flow of control will pass to the decision step 16; the result of the decision in this decision step 16 will be NO, so that the flow of control will pass to the decision step 20; and the result of the decision in this decision step 20 will likewise be NO, so that the flow of control will pass to the step 21; and in this step 21 the CPU 22 will maintain the value of the output Fin which is being inputted to the adder of each of the actuators without change. Accordingly, since the force by which the vehicle body 3 is supported by each of the actuators 4 is not changed, the vehicle body 3 is maintained in its current state of motion by inertia, for example is maintained in the state of horizontal motion in the case of level vehicle operation, and accordingly in each of the actuators 4 no substantial relative movement of the piston member 6 thereof with respect to the cylinder member 5 thereof will occur, and the vehicle will proceed without any substantial change of relative displacement in the vertical direction of the vehicle body 3 with respect to the road surface.

(B) The Case When the Vehicle is Traveling Along a Road which has Small Undulations In this case, during the performance by the CPU 22 of the program whose flow chart is shown in FIG. 3, in each iteration around the large loop thereof: if the vehicle is traveling along a descending portion of this road surface which has small undulations, then the result of the decision in the decision step 4 will be YES, so that the flow of control will pass to the decision step 5, and the result of the decision in this decision step 5 will be NO, so that the flow of control will pass to the step 6; while, on the other hand, if the vehicle is traveling along an ascending portion of this road surface which has small undulations, then the result of the decision in the decision step 4 will be NO, so that the flow of control will pass to the decision step 10, and the result of the decision in this decision step 10 will be YES, so that the flow of control will pass to the decision step 11, and the result of the decision in this decision step 11 will be NO, so that the flow of control will pass to the step 12. In either case, therefore, i.e. in the step 6 or in the step 12 respectively, the CPU 22 will maintain the value of the output Fin which is being inputted to the adder of each of the actuators without change. Accordingly, again, since the force by which the vehicle body 3 is supported by each of the actuators 4 is not changed, the vehicle body 3 is maintained in its current state of motion by inertia, and the vehicle will proceed with the vehicle wheels only following the undulations in the road surface. In other words, the vehicle wheels will be displaced vertically following the undulations in the road surface, while in this case, as in the case (a) described above, the vehicle body 3 will not substantially oscillate at all in the vertical direction.

(C) The Case When the Vehicle is Traveling Along a Steeply Inclined Road

In this case, during the performance by the CPU 22 of the program whose flow chart is shown in FIG. 3, in each iteration around the large loop thereof, if the vehicle is traveling along a descending portion of this road surface which has a steep downhill inclination or unevenness, then the result of the decision in the decision step 4 will be YES, so that the flow of control will pass to the decision step 5, and the result of the decision in this decision step 5 will likewise be YES, so that the flow of control will pass to the step 7. Therefore, in this step 7, according to the previously mentioned force pattern generation program module (rate of change control for contraction, with K large) not particularly detailed herein, the CPU 22 will vary the control signal Fc for the value of the output Fin which is being inputted to the adder of each of the servo actuators, so as to vary the force pattern of each of these servo actuators as shown in FIG. 4 and so as thereby to vary the force exerted by of the piston members 6 of said servo actuators with respect to their cylinder members 5, and thereby to vary the rate of absolute movement of the vehicle body, as also shown in that figure, so as to drive the vehicle body downwards with a relatively large force, i.e. so as to impart a downward speed component to the vehicle body 3; and then the flow of control passes next to the decision step 8. In the case that the inclination of the road surface on which the vehicle is being driven is large, the result of the decision in this decision step 8 will be YES, so that the flow of control will pass to the step 9, and in this step 9 according to another previously described force pattern generation program module (displacement control for contraction) not particularly detailed herein, the CPU 22 varies the control signal Fc for the value of the output Fin which is being inputted to the adder of each of the servo actuators, so as, by suitably varying the force exerted on the pistons 6 of these servo actuators as shown in FIG. 6, to vary the force exerted by the pistons 6 with respect to the cylinder members 5 of each of these servo actuators as also shown in that figure, so as to reduce the absolute height of the cylinder 5, i.e. the vehicle body. In other words, a vehicle height reduction adjustment is carried out; and then the flow of control passes next via the asterisk label back to the program step 1 to cycle around repeatedly in a closed loop. On the other hand, if the inclination of the road surface on which the vehicle is being driven is small, the result of the decision in the decision step 8 will be NO, and in this case the flow of control will directly cycle round again, via the asterisk label, back to the program step 1.

On the other hand, in this case, if the vehicle is traveling along an ascending portion of this road surface which has a steep uphill inclination or unevenness, then the result of the decision in the decision step 4 will be NO, so that the flow of control will pass to the decision step 10, and the result of the decision in this decision step 10 will be YES, so that the flow of control will pass to the decision step 11, and the result of the decision in this decision step 11 will likewise be YES, so that the flow of control will pass to the step 13. Therefore, in this step 13, according to the previously mentioned force pattern generation program module (rate of change control for expansion, with K large) not particularly detailed herein, the CPU 22 will vary the control signal Fc for the value of the output Fin which is being inputted to the adder of each of the servo actuators, so as to vary the force pattern of each of these servo actuators as shown in FIG. 5 and so as thereby to vary the force exerted by the piston members 6 of said servo actuators with respect to their cylinder members 5, and thereby to vary the rate of absolute movement of the vehicle body, as also shown in that figure, so as to drive the vehicle body upwards with a relatively large force, i.e. so as to impart a upward speed component to the vehicle body 3; and then the flow of control passes next to the decision step 14. In the case that the of the road surface on which the vehicle is being driven is large, the result of the decision in this decision step 14 will be YES, so that the flow of control will pass to the step 15, and in this step 15 according to another previously described force pattern generation program module (displacement control for contraction) not particularly detailed herein, the CPU 22 varies the control signal Fc for the value of the output Fin which is being inputted to the adder of each of the servo actuators, so as, by suitably varying the force exerted on the pistons 6 of these servo actuators as shown in FIG. 7, to vary the force exerted by the pistons 6 with respect to the cylinder members 5 of each of these servo actuators as also shown in that figure, so as to increase the absolute height of the cylinder 5, i.e. the vehicle body. In other words, a vehicle height increase adjustment is carried out; and then the flow of control passes next via the asterisk label back to the program step 1 to cycle around repeatedly in a closed loop. On the other hand, if the inclination of the road surface on which the vehicle is being driven is small, the result of the decision in the decision step 14 will be NO, and in this case the flow of control will directly cycle round again, via the asterisk label, back to the program step 1.

Thus, in this case that the vehicle is traveling along a sudden incline of the like, a velocity component in the vertical direction will be imparted to the vehicle body 3, whereby said vehicle body 3 will be allowed to be maintained in its state of driving along said incline or the like by virtue of its own inertia; and, if the inclination of the road surface varies by more than a certain amount, the velocity component in the vertical direction of the vehicle body will be varied according to the magnitude of said inclination of the road surface.

Thereby, it is ensured that the vehicle body 3 will be allowed to drive smoothly along the inclined road surface.

If the inclination of the road surface is in fact substantially constant, and the vehicle body is once put into the state of traveling along this inclined road surface by its own inertia, then the result of the decision in the decision step 4 will be NO, so that the flow of control will pass to the decision step 10, and the result of the decision in this decision step 10 likewise will be NO, so that control will be carried out in substantially the same manner as in the cases (d) and (e) which will be described hereinafter. On the other hand, in the case that the inclination of the road surface is in fact substantially constant, but there are small undulations in the road surface, then the results of the decisions in the decision steps 5 and 11 will be NO, and control will be carried out in substantially the same manner as in the case (b) which has been described above, and therefore, while the vehicle wheels will be displaced vertically following the undulations in the road surface, this vertical motion of the vehicle wheels will be prevented from being transmitted to the vehicle body 3, and the vehicle body 3 will not substantially oscillate at all in the vertical direction.

(D) The Case When the Vehicle is Traveling Along a Relatively Gradually Inclined Road In this case, during the performance by the CPU 22 of the program whose flow chart is shown in FIG. 3, in each iteration around the large loop thereof: the result of the decision in the decision step 4 will be NO, so that the flow of control will pass to the decision step 10; the result of the decision in this decision step 10 likewise will be NO, so that the flow of control will pass to the decision step 16; but the result of the decision in this decision step 16 will be YES, so that the flow of control will pass to the decision step 17. In the case that the vehicle is traveling along a descending portion of a relatively gradually inclined road, the result of the decision in this decision step 17 will be YES, so that the flow of control will pass to the step 18; and in this step 18, according to another previously mentioned force pattern generation program module (rate of change control for contraction) but particularly detailed herein, the CPU 22 will vary the control signal Fc for the value of the output Fin which is being inputted to the adder of each of the servo actuators, so as to vary the force pattern of each of these servo actuators as shown in FIG. 8 and so as thereby to vary the force exerted by the piston members 6 of said servo actuators with respect to their cylinder members 5, and thereby to vary the rate of absolute movement of the vehicle body, as also shown in that figure, so as to impart a compression to each of the actuators, in other words so as to impart a downward velocity component to the vehicle body 3; and then the flow of control will pass next via the asterisk label back to the program step 1 to cycle around repeatedly in a closed loop. On the other hand, in the case that the vehicle is traveling along an ascending portion of a relatively gradually inclined road, the result of the decision in this decision step 17 will be NO, so that the flow of control will pass to the step 19; and in this step 19, according to another previously mentioned force pattern generation program module (rate of change control for expansion) not previously detailed herein, the CPU 22 will vary the control signal Fc for the value of the output Fin which is being inputted to the adder of each of the servo actuators, so as to vary the force pattern of each of these servo actuators as shown in FIG. 9 and so as thereby to vary the force exerted by the piston members 6 of said servo actuators with respect to their cylinder members 5, and thereby to vary the rate of absolute movement of the vehicle body, as also shown in that figure, so as to impart an expansion to each of the actuators, in other words so as to impart an upward velocity component to the vehicle body 3; and then as before the flow of control will pass next via the asterisk label back to the program step 1 to cycle around repeatedly in a closed loop.

Accordingly, when the vehicle is travelling along a relatively gradually inclined road surface, by applying a velocity component in the vertical direction to the vehicle body 3, said vehicle body 3 is maintained in its current state of motion along said inclined road surface by inertia, and accordingly the vehicle will be ensured of smooth driving along the road surface.

(E) The Case When the Vehicle is Traveling Along an Extremely Gradually Inclined Road In this case, during the performance by the CPU 22 of the program whose flow chart is shown in FIG. 3, in each iteration around the large loop thereof: the result of the decision in the decision step 4 will be NO, so that the flow of control will pass to the decision step 10; the result of the decision in this decision step 10 will likewise be NO, so that the flow of control will pass to the decision step 16; and the result of the decision in this decision step 16 will likewise be NO, so that the flow of control will pass to the decision step 20. In the case that the average displacement amount of the pistons is within the limit value $Ym_1$, the result of the decision in this decision step 20 will be NO, so that the flow of control will pass to the step 21; and in this step 21, as explained earlier, the CPU 22 will maintain the value of the output Fin which is being inputted to the adder of each of the actuators without change, whereby, since the force by which the vehicle body 3 is supported by each of the actuators 4 is not changed, the vehicle body 3 is maintained in its current state of motion by inertia, and accordingly in each of the actuators 4 no substantial change of the force exerted by the piston member 6 thereof with respect to the cylinder member 5 thereof will occur, and the vehicle will proceed without any substantial change of absolute displacement in the vertical direction of the vehicle body 3. On the other hand, in the case that the average displacement amount of the pistons is outside the limit value $Ym_1$, the result of the decision in the decision step 20 will be YES, so that the flow of control will pass to the decision step 22.

In this decision step 22, in the case that the vehicle is traveling along a descending portion of an extremely gradually inclined road, the result of the decision in this decision step 22 will be YES, so that the flow of control will pass to the step 23; and in this step 23, according to another previously mentioned force pattern generation program module (displacement control for contraction) not particularly detailed herein, the CPU 22 will vary the control signal Fc for the value of the output Fin which is being inputted to the adder of each of the servo actuators, so as to vary the force pattern of each of these servo actuators as shown in FIG. 10 and so as thereby to vary the positions of the cylinder members 5, as also shown in that figure, so as to impart a compression to each of the actuators, in other words so as to carry out a height reduction adjustment for the vehicle body 3; and then the flow of control will pass next via the asterisk label back to the program step 1 to cycle around repeatedly in a closed loop. On the other hand, in the case that the vehicle is traveling along an ascending portion of an extremely gradually inclined road, the result of the decision in this decision step 22 will be NO, so that the flow of control will pass to the step 24; and in this step 24, according to another previously mentioned force pattern generation program module (displacement control for expansion) not particularly detailed herein, the CPU 22 will vary the control signal Fc for the value of the output Fin which is being inputted to the adder of each of the servo actuators, so as to vary the force pattern of each of these servo actuators as shown in FIG. 11 and so as thereby to vary the positions of the cylinder members 5, as also shown in that figure, so as to impart an expansion to each of the actuators, in other words so as to carry out a height increase adjustment for the vehicle body 3; and then as before the flow of control will pass next via the asterisk label back to the program step 1 to cycle around repeatedly in a closed loop.

Accordingly, when the vehicle is travelling along an extremely gradually inclined road surface, when the piston strokes required from the actuators are within their limits, the vehicle body 3 is maintained in a substantially unchanged driving attitude; but, on the other hand, when the piston strokes required from the actuators are outside their limits, by applying a vehicle height increase or decrease adjustment in the vertical direction to the vehicle body 3, said vehicle body 3 is ensured of smooth driving along the road surface.

Summary

From the above description, it will be understood that, according to the functioning of the preferred embodiment of the active suspension system of the present invention as described above, not only (of course) in the case that the vehicle is traveling along a substantially flat road, but also in the case that the vehicle is traveling along a road surface which is formed with relatively small undulations, the support force with which each of the actuators supports the vehicle body over its respective vehicle wheel is not substantially increased or substantially decreased, i.e. is not substantially changed, and thereby the vehicle wheels are allowed to travel while freely following the undulations in the surface of the road, while on the other hand the body of the vehicle is allowed to continue in a constant driving position by its own inertia; for example, in the case of a horizontal road surface, the vehicle body is allowed to maintain a horizontal driving attitude and moves steadily and horizontally. On the other hand, in the case that the vehicle is traveling along an inclined road, the body of the vehicle will be imparted with a vertical displacement according to the vertical displacement of the inclined road surface, or will be imparted with a vertical acceleration or deceleration, and thereby it will be ensured that the vehicle body will travel according to the vertical displacement of the inclined road surface. Also, in this case, even if there are relatively small undulations in the surface of this inclined road surface, the vehicle wheels will travel along these road surface undulations, but the vehicle body itself will be maintained in its current driving attitude by inertia (its driving attitude following the overall inclination of the inclined road surface), and as a result of this, whatever be the state of the vertical displacement of the road surface, the vehicle wheels will be ensured of being able to travel along it, and, as compared to the case of a conventional spring type suspension system or to the case of a suspension system of any of the types discussed in the section of this specification entitled "Background Of The Invention", the ride comfort of the vehicle will be substantially improved.

Possible variations

Although in the shown and described preferred embodiments of the system and method of the present invention the force patterns generated in the force pattern generation modules represented in the flow chart of FIG. 3 by the blocks 7, 13, 9, 15, 18, 19, 23, and 24 were each of them constant, in an alternative possible implementation, which should be considered as falling within the scope of the present invention, it would be possible, for each such force generation module, for a plurality of force generation patterns to be provided, and to be stored in the ROM 24 of the micro computer 20. In such a case, appropriate ones of these force generation patterns would be selected, in the steps 7 and 13 according to the size of the absolute value of the average value Y of the displacement amounts of the pistons 6 relative to their cylinder members 5 and the absolute value of the amount of change delta-Y thereof, in the steps 9 and 15 according to the size of the absolute value of the amount of change delta-Y, in the steps 18 and 19 according to the size of the absolute value of the average V of the relative rates of motion of the pistons 6 relative to their cylinder members 5, and in the steps 23 and 24 according to the size of the absolute value of the average value Y of the displacement amounts of the pistons 6. All such modifications should be understood to be subsumed under the concept of the present invention.

Likewise, although in the shown and described preferred embodiments of the system and method of the present invention the average value Y of the displacement amounts of the pistons 6 for the actuators for the front right vehicle wheel and for the front left vehicle wheel was calculated, and the actuator of each of said front right vehicle wheel and front left vehicle wheel was controlled based upon said average value Y, in an alternative possible implementation, which should be considered as falling within the scope of the present invention, it would be possible for this average displacement amount value Y to be calculated for all of the four vehicle wheels together. Alternatively, it would be possible for control to be carried out for each of the vehicle wheels separately, in the same or a similar manner to the control which was, in the shown preferred embodiments, carried out according to the FIG. 3 flow chart. In such a case, the values Y and V of the FIG. 3 flow chart would not be average values, but instead the process of the FIG. 3 flow chart would be carried out, for each of the actuators 4, with these values respectively being the displacement amounts and the rate of relative motion of each of the piston members 6 with respect to its corresponding cylinder member 5. Again, all such modifications should be understood to be subsumed under the concept of the present invention.

Conclusion

Although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a vehicle which is equipped with a body and a plurality of vehicle wheels for running on a road surface, an active suspension system comprising:
   (a) a plurality of suspension actuators each being provided for one of said plurality of vehicle wheels and continually producing a supporting force for supporting said vehicle body on the corresponding vehicle wheel;
   (b) a means for detecting an amount of relative movement between each said vehicle wheel and the vehicle body; and
   (c) a calculation and control means for calculating a target value of said supporting force produced by each said suspension actuator according to the amount of relative movement between the corresponding vehicle wheel and the vehicle body detected by said relative movement detecting means and controlling each said suspension actuator so that the supporting force produced by each said suspension actuator conforms to the target value of said supporting force for each said suspension actuator.

2. An active suspension system according to claim 1, wherein said calculation and control means calculates a rate of relative movement between each corresponding vehicle wheel and the vehicle body and calculates said target value according to the amount and the rate of said relative movement.

3. An active suspension system according to claim 1, wherein said calculation and control means calculates said target value of said supporting force to change with lapse of time so that a rate of relative movement between the corresponding vehicle wheel and the vehicle body changes just as much as a target value of change of said rate when an absolute rate of relative movement between the corresponding vehicle wheel and the vehicle body is greater than a first predetermined value for said absolute rate and when the absolute amount of relative movement between the corresponding vehicle wheel and the vehicle body is greater than a first predetermined value of said amount.

4. An active suspension system according to claim 3, wherein said calculation and control means further calculates said target value of said supporting force to change with lapse of time so that the amount of relative movement between the corresponding vehicle wheel and the vehicle body changes just as much as a target value of change of amount of relative movement when said absolute rate is greater than a second predetermined value for said absolute rate.

5. An active suspension system according to claim 3, wherein said target value of change of the rate of relative movement between the corresponding vehicle wheel and the vehicle body is smaller when said predetermined amount for said absolute rate is smaller than said first predetermined value but not smaller than a second predetermined value for said absolute rate.

6. An active suspension system according to claim 1, wherein said calculation and control means calculates said target value of said supporting force to change with lapse of time so that the amount of relative movement between the corresponding vehicle wheel and the vehicle body changes just as much as a target value of change of said amount of relative movement when an absolute rate of relative movement between the corresponding vehicle wheel and the vehicle body is smaller than a predetermined value and when said absolute amount of relative movement beween the corresponding vehicle wheel and the vehicle body is not smaller than a predetermined value of said amount of relative movement.

7. An active suspension system according to claim 1, further comprising a means for detecting the actual supporting force produced by each said suspension actuator, wherein said calculation and control means compares the actual supporting force detected by said actual supporting force detecting means with the calculated target value of said supporting force, and controls each said suspension actuator according to a feedback process so as to reduce the difference between the actual supporting force and the calculated target value of said supporting force to zero.

* * * * *